United States Patent [19]

Krol

[11] 3,908,087

[45] Sept. 23, 1975

[54] TIME-DIVISION TELECOMMUNICATION SYSTEM FOR THE TRANSMISSION OF DATA VIA SWITCHED CONNECTIONS

[75] Inventor: Thijs Krol, Eindhoven, Netherlands

[73] Assignee: U.S. Philips Corporation, New York, N.Y.

[22] Filed: May 9, 1974

[21] Appl. No.: 468,218

[30] Foreign Application Priority Data

May 23, 1973 Netherlands ........................ 7307169

[52] U.S. Cl. ............................................. 179/15 AF

[51] Int. Cl.² ............................................ H04J 3/06

[58] Field of Search .................................. 179/15 AF

[56] References Cited

UNITED STATES PATENTS

| | | | |
|---|---|---|---|
| 3,504,287 | 3/1970 | Deregnaucourt | 179/15 AF |
| 3,646,445 | 2/1972 | Reindl | 179/15 AF |
| 3,749,839 | 7/1973 | Fornasiero | 179/15 AF |

*Primary Examiner*—Ralph D. Blakeslee
*Attorney, Agent, or Firm*—Frank R. Trifari; Simon L. Cohen

[57] ABSTRACT

Time-division multiplex telecommunication system for data transmission via switched connections. In one channel of a data multiplex stuffing information is sent. The data multiplex is transmitted to a switching centre in a time channel of a highway, the time channel being connected to three internal outgoing time channels in said centre. From the information received from these three channels the original information is restored. The rate of the restored information is converted to the rate of an outgoing time channel by the addition or removal of stuffing information. The converted information is applied to in internal incoming time channel which is connected to an outgoing time channel for further transmisstion of the data.

1 Claim, 3 Drawing Figures

Figure 1:
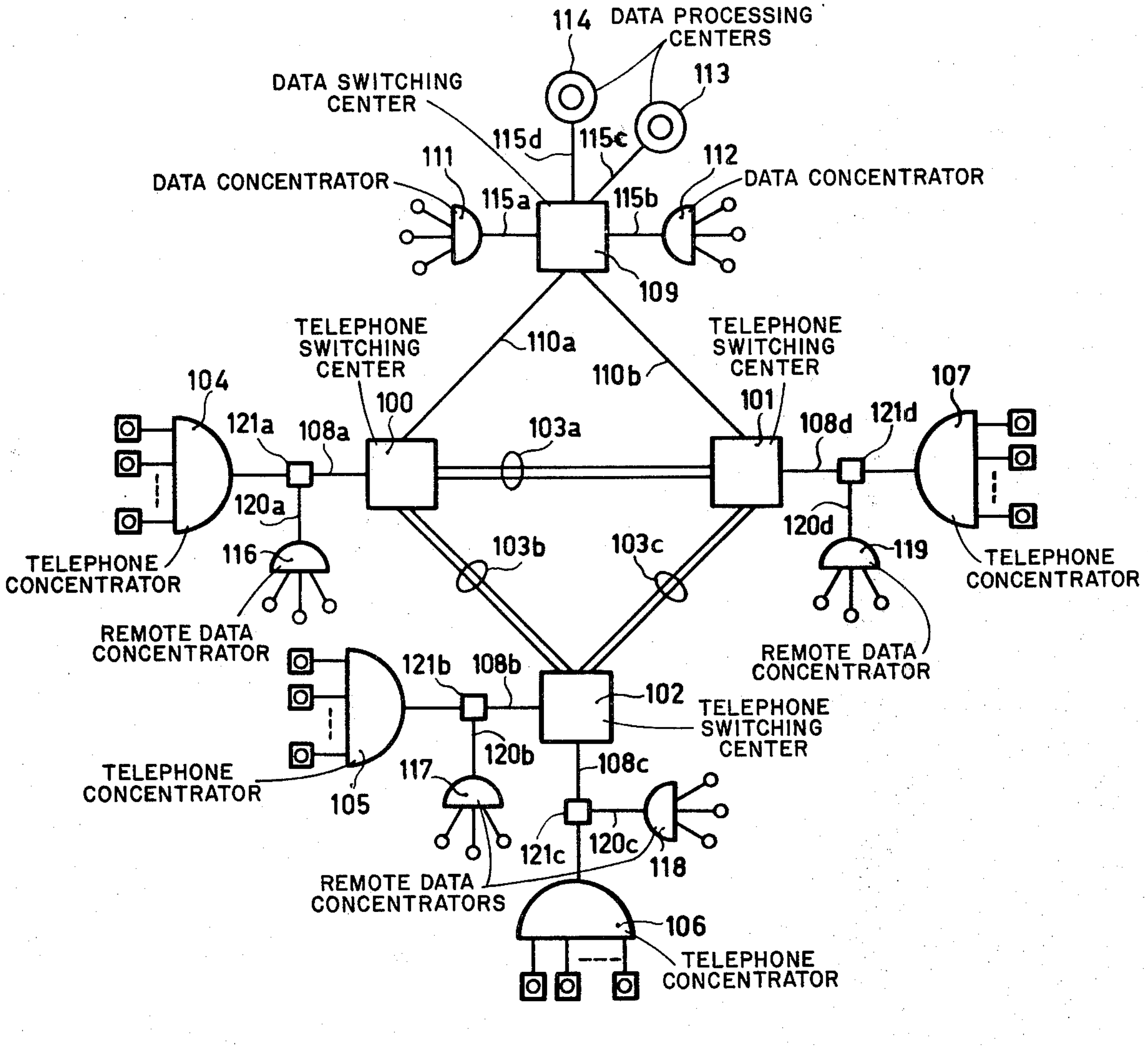

TIME-DIVISION TELECOMMUNICATION SYSTEM FOR THE TRANSMISSION OF DATA VIA SWITCHED CONNECTIONS

The invention relates to a time-division telecommunication system for data transmission via switched connections comprising a data transmitter for the transmission of pulse groups which are transmitted in different pulse group positions of consecutive multiplex frames, a transmission highway using time-division, means for transmitting the pulse groups from the data transmitter via the transmission high-way in one time slot of a cyclic sequence of time slots, which time slot characterizes a time channel, a switching system comprising a plurality of incoming and outgoing transmission highways, which switching system comprises means for connecting the time channels of the incoming transmission highways to arbitrary time channels of the outgoing transmission highways.

In switched telephone connections of an asynchronous TDM network slip occurs as a result of lack of synchronism of the clocks of such a network. The term slip is to be understood to mean the shift of an incoming pulse stream relative to an outgoing pulse stream which causes pulses to be lost or to be added occassionally. For telephone communication this slip is permissible if stable clocks are used; for data communications this slip is inadmissible.

When via a telephone connection time-multiplexed data signals are transmitted in frames which each comprise a sequence of positions associated with data channels, slip in the telephone connection will result in the channel structure being disturbed. Consequently are temporarily made in all channels until the correct channel structure has been found again.

It is an object of the present invention to provide a telecommunication system of the type referred to in which the effects of slip are eliminated, thus enabling switched telephone connections of the asynchronous TDM network to be used for data transmission.

The telecommunication system according to the invention is characterized in that the data transmitter comprises means for continuously transmitting stuffing pulse groups in a particular pulse group position of the multiplex frame, in that the switching system comprises an internal outgoing transmission highway and an internal incoming transmission highway, in that the incoming time channel of the incoming transmission highway which is connected to the data transmitter is connected to three time channels of the internal outgoing transmission highway, in that a device connected to this transmission highway is provided for restoring the sequence of pulse groups supplied by the incoming time channel from the sequences of pulse groups which are received in the three time channels, in that means are provided for converting the pulse repetition rate of the restored sequence of pulse groups to the pulse repetition rate of an outgoing time channel by the addition or removal of stuffing pulse groups, in that means are provided for applying the converted sequence of pulse groups to an internal incoming time channel of the internal incoming transmission highway, and in that to complete the connection the internal incoming time channel is connected to a time channel of an outgoing transmission highway.

It should be mentioned that from our copending Netherlands Patent Application 7,101,468 of prior date it is known to connect a time channel of an incoming transmission highway by way of three internal time channels to a receiver and to restore the original information in the receiver. In this prior application, however, only a connection between an incoming time channel and a receiver of the switching center is comtemplated.

Figure 2:
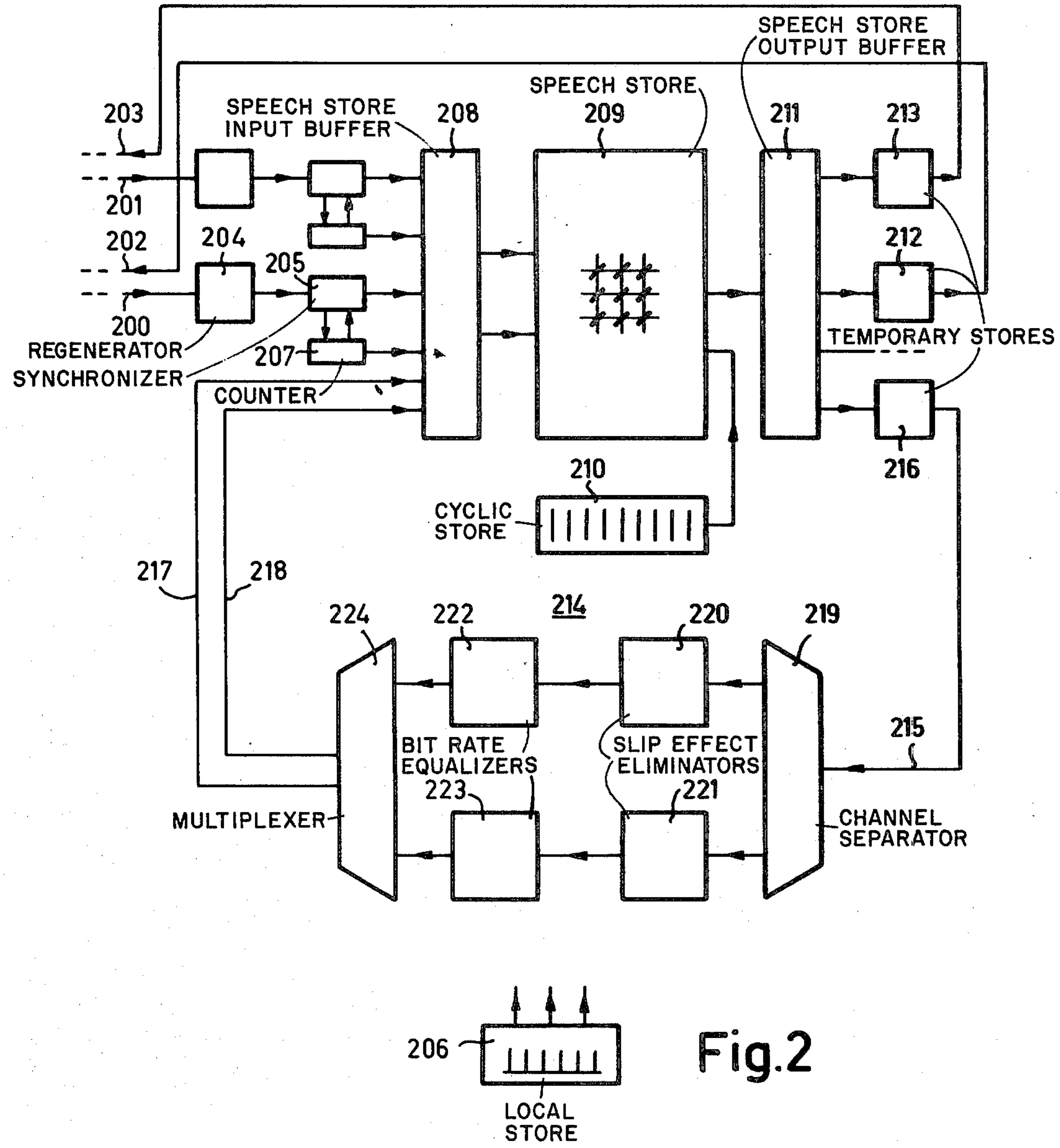
Figure 3:
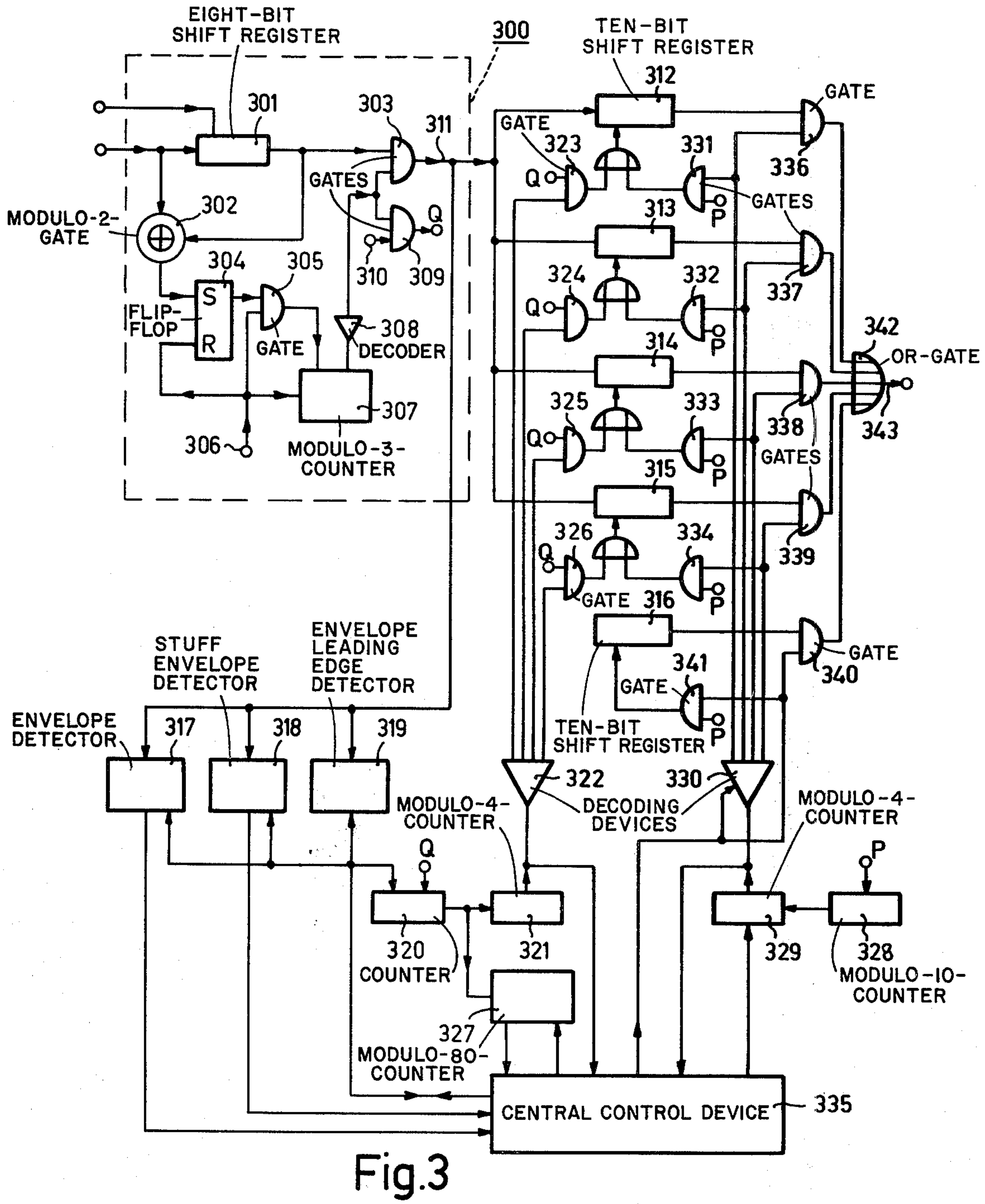

An embodiment of the invention will now be described, by way of example, with reference to the accompanying diagrammatic drawings, in which:

FIG. 1 is a diagram of a telecommunication network using time division for telephone and data traffic, FIG. 2 is a block-schematic diagram of a TDM switching center according to the invention, and FIG. 3 is a block-schematic diagram of two devices of the switching center of FIG. 2 for use in a switched connection for data transmission.

For long-distance data transmission fixed connections are used which may or may not be specifically equipped for data transmission. An example of not specifically equipped connections are fixed telephone connections which are made available by the Post Office authorities between two fixed points. The rent of such links is comparatively high. Hence what are generally termed switched telephone connections in the public telephone network are used for data transmission.

At present the public telephone network is mainly equipped with electromechanical switching means which give rise to a fair number of disturbances in the telephone connections. Hence in addition to the telephone network a separate public data network is required. However, in view of the initially small number of subscribers and the large distances to be traversed such a data network is very expensive.

In public telephony developments are afoor which tend towards digital transmission of speech signals and time division multiplexing (TDM) and also towards time division multiplex switching of the telephone connections while retaining the digital form of the speech signal. Such integrated telephone networks in which pulse streams flow along the transmission paths and in which pulse streams are switched in the switching center, in principle are suitable for data transmission also.

An integrated telephone network may be in the form of a synchronous network or of an asynchronous network. In the latter case each switching center has its own clock which is independent of the clocks of the other switching centers. In such an asynchronous network shifts occur between the phases of the various clocks with consequent shifts between the incoming and outgoing pulse streams in a switching center. These shifts of one pulse stream relative to the others which entail the loss or the addition of pulses are termed "slip". In a narrower sense slip means the loss or addition of pulses or pulse groups, according to the context.

In TDM telephone systems speech signals are sampled at a sample rate of for example 8,000 samples per second and the value of each sample is coded in a binary code. A plurality of speech signals are multiplexed by allocating to each speech signal one time slot of a cycle of time slots, which cycle has a duration of one sampling period, which in this case is 1/8000 second or 125 $\mu$s. In each time slot the code of one sample is transmitted in the form of a groups of binary pulses, i.e. pulses an electric characteristic of which, such as the amplitude or polarity, can assume two different values depending upon the transmitted information. Assuming a group of 8 pulses to be transmitted in each time slot, the bit rate per time slot is 64,000 bits/second and for 32 time slots in one cycle a bit rate of 2,048 kb/s.

Switching a telephone connection in a switching center of an asynchronous telephone network generally is effected in the following manner. In a synchronizer the received pulse stream is synchronized with the clock of the switching center and the pulses are combined to form groups such that each group represents a sample of a speech signal. The pulse groups which relate to the same speech signal are applied to a storage location of a speech store from which the pulse groups are read out under control of a cyclically acting control store for transfer to an outgoing line and for sending over this line a time slot. At the incoming end the storage location of the speech store is selected by the channel number or time slot number of the incoming speech signal, which number is derived by the synchronizer from synchronization information included in the pulse stream. The process of applying the signal samples or pulse groups of storage locations the addresses of which are related to the channel numbers is a demultiplexing operation, because time division signals are converted into space division signals. The reverse process of reading out the pulse groups, transferring to an outgoing line and sending in a time slot is a remultiplexing operation.

A switching center may comprise a plurality of incoming speech stores, one for each incoming TDM line or for each group of incoming TDM lines, none or one or more switching stages having time-multiplex controllable crosspoints for providing transmission paths between the speech stores and the outgoing TDM lines, and possibly outgoing speech stores interposed between the outputs of the final switching stage and the outgoing TDM lines.

The phenomenon which hereinbefore was termed slip manifests itself in the incoming speech store in that occasionally a signal sample is written in a store location before the preceding signal sample has been read out or in that a signal sample is again read out before a new signal sample has been written in. In the first case a signal sample is lost, and in the second case an additional signal sample is added.

A telephone connection in a TDM network permits the transfer of data at a rate of 64,000 b/s, allowance having to be made for a certain amount of signalling information. Usual rates of data subscribers' apparatus are 600, 2400, 4800 and 9600 b/s. Hence it has been proposed to connect the data subscribers to a data concentrator which has a multiplexing/demultiplexing function and which through a line having a bit rate of 64,000 b/s is connected to a suitable point of the TDM telephone network. A suitable point is the output of a concentrator for the speech signals at least one time slot of which is reserved for data transmission. Thus the situation arises that a group of time-multiplexed data signals or data multiplex forms part of a higher-order multiplexing or speech multiplex. On given main transmission paths this speech multiplex may in turn form part of a higher-order speech multiplex.

For the purpose of the present application the aforementioned data multiplex may suitably be referred to as first-order multiplex, the speech multiplex being referred to as second-order multiplex.

In the switching center of the telephone network incoming telephone channels are connected to outgoing telephone channels in a selective manner in accordance with dialling information. In the switched TDM telephone network point-to-point data connections may be established via telephone channels, i.e. connections having fixed routes. These connections may serve as incoming and outgoing lines of a data network having separate data switching center. The telephone network then serves only as a carrier network for the data, the connections between data channels being established by the data switching centers.

By way of illustration FIG. 1 shows a TDM telephone network which is equipped with telephone switching centers 100, 101 and 102 which are interconnected by groups 103*a*, 103*b* and 103*c* of TDM transmission highways. Telephone concentrators are designated by 104, 105, 106 and 107. They are connected via highways 108*a*, 108*b*, 108*c* and 108*d* respectively to the nearest switching centers.

A data switching center is shown at 109. This switching center is connected via highways 110*a* and 110*b* to the telephone switching centers 100 and 101 respectively. Two data concentrators 111 and 112 and two data processing centers 113 and 114 are connected to the data switching center 109 via data highways 115*a*, 115*b*, 115*c* and 115*d* respectively. The term data highway is to be understood to mean a facility having a high bit rate, such as a telephone channel.

Remote data concentrators are designated by 116, 117, 118 and 119. They are connected via data highways 120*a*, 120*b*, 120*c* and 120*d* respectively to insertion units 121*a*, 121*b*, 121*c* and 121*d* respectively placed at the outputs of the telephone concentrators 104, 105, 106 and 107 respectively. These insertion units send the data multiplex of a data highway in a reserved time slot of the telephone highway, and in the opposite signal direction they receive a data multiplex from a reserved time slot of the telephone highway and send it to the data highway. Hence these insertion units may be regarded as the analog of a channel separating filter in a frequency multiplex carrier telephony system.

In the switching center 100, 101 and 102 fixed data connections are made between the incoming and outgoing telephone channels used for data transmission so that a data multiplex sent by a remote data concentrator is led by a fixed route through the telephone network to the data switching center 109. A data multiplex sent by the data switching center to the remote data concentrator takes the same route in the opposite direction.

In an asynchronous telephone network the telephone switching centers 100, 101 and 102 each have their own clock. These clocks have high stability, but mutual phase differences are uncontrolled. As a result, slip occurs in the switched telephone connections so that occasionally a sample is lost or an additional sample is added. At a clock stability of $1 \cdot 10^{-6}$ slip will occur about every 2 minutes. This is of little consequence to speech. The consequences for a data multiplex transmitted via the telephone connection are more severe because owing to the slip the duration of the multiplex frame is disturbed. A data multiplex comprises a plurality of data channels to which one or more pulse group positions of the multiplex frame are assigned, and when owing to slip the frame length varies the channel structure is disturbed.

By way of example a data multiplex for four 12,800 b/s data channels and 16 800 b/s data channels will be considered. The bit rate of the data multiplex is: 4:12,800 + 16:800 = 64,000 b/s and is equal to that of a telephone channel. In each channel the bits are transmitted in groups of 10 bits each, which are referred to as envelopes. Each envelope comprises 10 bits, i.e. 1 synchronizing bit, 1 status bit and 8 information bits. The synchronizing bit always has the value 1; the status bit has the value 1 when the next 8 bits relate to signalling, and the value 0 when the next 8 bits relate to data from the subscriber. The rate of the data channel having the lowest bit rate is 80 envelopes/second. The frame length of the data multiplex then is 1/80 s, that is 12,500 μs. This frame is divided into 80 pulse group or envelope positions which are numbered, for example, 0 to 79. The positions 0, 5, 10, . . . , 75 are assigned to the 16 800 b/s data channels. The positions 1, 6, 11, . . . , 76 are assigned to the first 12,800 b/s data channel; the positions 2, 7, 11, . . . , 77 are assigned to the second 12,800 b/s data channel, and so on.

In a time slot of a speech multiplex a group of 8 bits is transmitted. When this time slot is reserved for a data multiplex, a group of 8 bits of the data multiplex is transmitted each time the time slot occurs. Thus transmission of one data frame requires 100 frames of the speech multiplex. When slip occurs in a telephone connection the length of the data frame is increased or reduced by 8 bits, so that the channel structure of the data multiplex is disturbed. As a result wrong information is received in all the data channels, and this is put to an end only after frame synchronization has been restored by a synchronizing proces.

Packaging the information bits in envelopes of 10 bits produces an increase in bit rate by a factor of 10/8. A further increase (by a factor of 16/1) is caused by adding additional envelopes for subscriber-wise rate matching, so that channel rates of 800, 1,600, 6,400 and 12,800 b/s correspond to the subscriberrates of 600, 1,200, 4,800 and 9,600 b/s.

Performing the synchronizing process takes some time and during this time errors are made in all the data channels. For frame synchronization of the data multiplex one of the low-rate data channels may be used in a manner analogous to the frame synchronization of the speech multiplex.

In order to obviate the consequences of slip for the transmission of a data multiplex via a switched telephone connection, according to the invention it is proposed to use one of the low-rate data channels of the data multiplex for the transmission of stuffing information which is detectable as such and is used in the switching centers of the telephone network so as to cause slip in a data multiplex connection to occur in a controlled manner. When the slip is controlled so that it occurs at a given position of the data frame, this position may be checked for the occurrence of slip at the receiver end and if slip is detected the frame synchronization may be controlled so as to be maintained. The latter is important to the incoming end of the data switching center 109 and to the incoming ends of the remote data concentrators 116, 117, 118 and 119.

In the data multiplex, which is given by way of example and which comprises four 12,800 b/s data channels and 16 800 b/s data channels, one 800 b/s channel is reserved for frame synchronization and one 800 b/s channel is reserved for the transmission of stuffing information. The latter is to be understood to mean that in each remote data concentrator an outgoing 800 b/s data channel is used for the transmission of stuff envelopes. This outgoing stuff channel otherwise is no different from an outgoing subscriber channel and it may be envisaged that a subscriber who continuously supplies stuffing information is connected to the outgoing stuff channel.

FIG. 2 illustrates the processing of a data multiplex including stuff information in a telephone switching center as it is being transferred from an incoming telephone channel to an outgoing telephone channel.

In FIG. 2 reference numerals 200 and 201 denote incoming highways and reference numerals 202 and 203 denote outgoing highways for second-order multiplexes. For the purpose of illustration the highways 201 and 203 may be compared to the highway 110 of FIG. 1, and highways 200 and 202 may be compared to the highway 108*a* of FIG. 1. The telephone switching center of FIG. 2 may then be compared to the telephone switching center 100 of FIG. 1.

It is assumed that as a part of a fixed switched telephone connection a data multiplex is to be transferred from the incoming highway 200 to the outgoing highway 203. In a regenerator 204 the incoming pulses are regenerated with respect to shape and time instant of occurrence and then applied to a synchronizer 205. The synchronizer synchronizes the pulse groups received in each time slot of a local cloc 206 and for each pulse group determines the number of the incoming highway. These numbers of the time slots, or the numbers of the telephone channels, are generated by a counter 207 which is controlled by the synchronizer. When the second-order multiplex comprises 32 telephone channels the counter 207 is a modulo-32 counter.

Each pulse group which has been synchronized with a time slot of the central clock 206 by the synchronizer 205 is applied together with the channel number to a device 208 which in a subinterval of the time slot applies the pulse group to a storage location of a speech store 209. As storage location is selected the storage location the address of which comprises a first part determined by the channel number and a second part determined by the number of the sub-interval used. The latter number is in unique relationship with the number of the incoming highway, that is to say each incoming highway is assigned by a subinterval of its own for access to the speech store.

The speech store 209 has a storage location for each incoming telephone channel, and all the pulse groups which are received from an incoming telephone channel are written in the associated storage location. This also applies to the incoming telephone channel through which a data multiplex is received.

Reading-out of the speech store 209 is effected under control of a cyclic store 210 which performs a complete cycle in every second-order multiplex cycle and comprises a number of storage locations which is equal to the product obtained by multiplying the number of time slots by the number of sub-intervals. The address of a storage location of the speech store can be stored in each storage location of the cyclic store.

The output of the store 209 is connected to a device 211 which applies a pulse group read out in a subinterval to an outgoing highway the number of which is in unique relationship with the number of the subinterval. Between the device 211 and the outgoing highways 202 and 203 devices 212 and 213 respectively are connected which each temporarily store a pulse group until the beginning of the next time slot and then serially send it out in this time slot.

A switched telephone connection is established in that there is stored in a storage location of the cyclic store 210, a first part of the address of which is determined by the outgoing channel number and a second part of which is determined by the number of the outgoing highway, the address of the storage location of the incoming telephone channel. Under control of the cyclic store 210 this storage location is read out once in every second-order multiplex cycle, and the pulse group read out is applied to the desired highway by the device 211. Thus there is a continuous transfer of pulse groups from the incoming telephone channel to the outgoing telephone channel.

The incoming telephone channels which are used for data transmission are not directly connected to the outgoing telephone channels for data transmission but via a connecting device generally indicated by 214. This connecting device at the incoming end is connected to an output of the device 211 and at the outgoing end to two inputs of the device 208.

The line 215, which connects the device 211 to the device 214, is an internal outgoing highway and may be compared to an outgoing highway such as 203, which is an external highway. A device 216, which is connected between the device 211 and the highway 215, has the same function as the devices 212 and 213. This simply means that the highway 215 is to be regarded as an outgoing highway, of the switching center, on the understanding that this outgoing highway terminates at the connecting device 214.

The two lines 217 and 118 which connect the output of the connecting device 214 to the device 208 may be compared to the connections of the synchronizer 205 and the counter 207 respectively to the device 208. Similarly to an incoming highway the lines 217 and 218 each are assigned a sub-interval having a given number. Hence the terminations of the lines 217 and 218 at the device 208 may simply be regarded as the terminations of an incoming highway or, in this case, of an internal incoming highway.

As will be set out more fully hereinafter, an incoming telephone channel for data transmission is connected to three channels of the highway 215 of eliminate the slip effects. A device 219 at which the highway 215 terminates has several outputs, two of which are shown in the Figure. At each of these two outputs of the device 219 the signals of a set of three channels of the highway 215 and the associated bit clock pulses appear. The two outputs of the device 219 are connected to devices 220 and 221 respectively. In each device 220, 221 there is derived from the information received from the three channels one information from which the slip effects have been eliminated.

In each device 222, 223 stuffing information is added or removed so as to make the incoming bit rate equal to the outgoing bit rate. When in the device 220, 221 the slip effects have been eliminated, at the output a bit rate is obtained which is equal to that of the incoming telephone channel. The bit rate at the output of the device 222, 223, however, is determined by the central clock 206 and may be different from that of the incoming telephone channel. Such different rates may be equalised by adding or removing stuffing information.

The device 222 and 223 are connected to a multiplexer 224. This provides access to the line 217 for each of the devices 222 and 223 in a different time slot of the second-order multiplex cycle and in each of these time slots supplies a different channel number to the line 218. In the same manner as the pulse groups from a telephone channel of an incoming highway such as 200 are stored in the speech store 209 the pulse groups from the device 222 are stored via the device 208 in a storage location of this store, which location is fixedly assigned to the device 222. Thus the inputs of the multiplexer 224 may simply be regarded as incoming telephone channels, or, in this case, as internal incoming telephone channels. These internal incoming telephone channels are connected to the external outgoing telephone channels for data transmission.

Thus a switched telephone connection for data transmission is established as follows. The (external) incoming telephone channel is connected via the speech store 209 to three internal outgoing telephone channels (highway 215). These three channels are combined to a single internal incoming telephone channel (output of the device 222 or 223). The latter channel then is connected to the (external) outgoing telephone channel via the speech store 209.

A connection of the (external) incoming telephone channel to three channels of the highway 215 may simply be established by storing the address of the respective storage location of the speech store in three different storage locations of the cyclic store 210.

The connections between the (external) incoming telephone channel and the three (internal) outgoing channels of the highway 215 are affected by slip in the same manner as are normal telephone connections. The slip phenomenon which is due to an increasing phase difference between stable clocks is a comparatively slowly proceding phenomenon. As a result, in one second-order multiplex cycle a pulse group will be lost or added in at most one of the three channels of the highway 215 and it will certainly be more than one cycle later before this effect is produced in another channel. In this respect it may be of advantage to make the spacing between the channels as large as possible, for example by using channels 0, 10 and 20. At a clock stability of $1 \cdot 10^{-6}$ slip occurs in each channel once every 2 minutes, and the instants at which slip occurs in the channels 0, 10 and 20 are relatively spaced by intervals of 40 seconds. When the pulse groups are designated by the letters A, B, C, and so on, at the input of the device 220 sequences of pulse groups are to be expected which have the following forms:

....A A A B B B C C C.... (1)
....A A A B B C C C.... (2)
....A A A B B B B C C C.... (3)

....A A A B B B B B B C C C.... (4)
....A A A B B B B B C C C.... (5)
....A A A B B B B B B B C C C.... (6)

The sequences (1), (2) and (3) relate to the case in which the sequence ....A B C.... is received from the incoming telephone channel; the sequences (4), (5) and (6) relate to the case in which the sequence ....A B B C.... is received.

The algorithm for deriving the original sequence from the sequence of pulse groups which appear at the input of the device 220 is as follows.

1. Count the number of successive equal pulse groups modulo-3 and start counting from zero again when a deviating pulse group is found.

2. Select the pulse group for which $n = 1$, where $n$ is the count (n going cyclically through the numbers 0, 1, 2).

FIG. 3 shows embodiments of the devices 220 and 222. The embodiment of the device 220 is shown at a block 300 within a broken-line box. In the block 300 the channel information output of the device 219 is connected to the input of an 8-bit shift register 301 and to an input of a modulo-2 gate 302. The output of the shift register is connected to a second input of the gate 302 and to a gate 303. The bit clock pulse output of the device 219 is connected to the control pulse input of the shift register 301 and controls the serion of the information pulses into the shift register. In each of the time slots associated with the three channels eight control pulses are applied to the shift register in order to store the applied pulse group in it.

The modulo-2 gate 302 delivers an output pulse when the two simultaneously applied pulses have different values. When this is the case, a flipflop 304 is set to the SET state. The flipflop 304 controls a gate 305 to which the central clock applies a clock pulse via a terminal 306 in each time slot. When the flipflop in the SET state the gate 305 is open and the pulse from terminal 306 sets a modulo-3 counter 307 to the RESET state.

The counter 307 has three states, viz the RESET state and the states "1" and "2". The state 1 is decoded by a device 308. When the counter 307 is in the state 1 the device 308 opens the gate 303 and a gate 309 to which the central clock applies a clock pulse from a terminal 310 in each bit period.

At the end of each time slot the pulse applied to the terminal 306 by the central clock sets the flipflop 303 to the RESET state and the counter 307 to the next state, unless the gate 305 is open, in which event the counter 307 is set to the RESET state.

It will be appreciated that the following operation is obtained.

When the shift register 301 contains the pulse group A and the next pulse group of the sequence, which will arbitrarily be considered as the first group, is a pulse group B the flipflop 304 is set to the RESET state. At the end of the time slot the clock pulse (306) sets the counter 307 to the RESET state. This clock pulse also sets the flipflop 304 to the RESET state.

When the second pulse group again is a pulse group B the flipflop 304 remains in the RESET state and at the end of the time slot the clock pulse (306) sets the counter 307 to the state 1. As a result the gates 303 and 309 are opened so that during the reception of the third pulse group the pulse group B stored in the shift register is applied to the output 311. Simultaneously a train of eight clock pulses (one for each bit period of the pulse group) appears at the output Q of the gate 309. When the third pulse group is not a pulse group B (sequence (2)) the same condition is obtained as that which prevailed on reception of the first pulse group B, with the difference that the shift register now contains the pulse group B and a pulse group C is received. If, however, the third pulse group is a pulse group B (sequence (1) or (3)), the counter 307 is set to the state 2 but otherwise nothing happens. When the fourth pulse group again is pulse group B (sequence (3)) the counter 307 is set to the RESET state and otherwise nothing happens. When the fifth pulse group again is a pulse group B (sequence (4), (5) or (6)) the counter 307 is set to the state 1 and the same condition is obtained as reception of the second pulse group B. The fifth pulse group B then is applied to the output 311 during reception of the next pulse group. The sicth pulse group B (sequence (4) or (5)) and the seventh one (sequence (6)) are not applied to the output 311, the eighth one however is and so on.

Thus there is applied to the output 311 of the block 300 a sequence of pulse groups which is identical with the sequence of pulse groups received from the (external) incoming telephone channel. The bit rate at the output 311 is equal to the bit rate of the (external) incoming telephone channel, while the bit rate of the (external) outgoing telephone channel is determined by the clock of the switching center. Matching between the incoming bit rate and the outgoing bit rate is effected in the device which is shown in FIG. 3 outside the box 300 and represents an embodiment of the devices 222 and 223 in FIG. 2.

The device comprises five 10-bit shift registers 312, 313, 314, 315 and 316. In the shift register 316 a pulse train comprising 10 pulses and corresponding to a stuff envelope is permanently stored. In the remaining shift registers the incoming pulses can be stored, arranged in envelopes of 10 bits each. The inputs of these shift registers are connected to the output 311 of the block 300. In this connection it should be stated again that the data multiplex chosen as an example and being transmitted via the telephone connection comprises consecutive frames of 12,500 μs each of which are divided into 80 envelope positions. The data multiplex comprises four 12,800 b/s channels and 16 800 b/s channels. One of the latter channels serves for frame synchronisation, for example the channel which corresponds to the envelope position O. Another 800 b/s channel serves to transfer stuffing information. This is, for example, the channel corresponding to envelope position 5.

The arrangement shown in FIG. 3 further comprises a device 317 for detecting the envelopes which serve for frame sysnchronization and are transmitted in position O of the data frame. A device 318 serves to detect the stuff envelopes. The devices 319 serves to detect the beginnings of the envelopes.

A counter 320, which is controlled by the clock pulses which appear at the output Q of the block 300 (hereinafter referred to as clock pulses Q), counts these clock pulses modulo-10 and produces an output pulse for each 10 clock pulses Q conted, that is to say one output pulse for each envelope.

The output pulses from the counter 320 control a modulo-4counter 321. The latter together with a decoding device 322 and gates 323, 324, 325 and 326, to which the clock pulses Q are applied and the outputs of which are connected via OR gates to the control inputs of the shift registers 312, . . . , 315, forms a pulse distributor. This pulse distributor distributes the clock pulses Q over the shift registers in a manner such that these registers are rendered operative in cyclic sequence so as to store a train of 10 output pulses from the output 311 of the block 300.

The output pulses from the counter 320 also control a modulo-80 counter 327, which serves to indicate the end of a data frame.

A modulo-10 counter 328 is controlled by clock pulses P. These clock pulses are produced in the bit periods of the time slot assigned to the output of the device 222 or 223 of FIG. 2. The counter 328 delivers an output pulse for every 10 clock pulses P. The output pulses from the counter 328 control a modulo-4 counter 329. The latter together with a decoding device 330 and gates 331, 332, 333 and 334 constitutes a pulse distributor. This pulse distributor distributes the clock pulses P over the shift registers 312, . . . , 315 in a manner such that these registers are rendered operative in cyclic sequence to deliver a number of pulses equal to the number of applied clock pulses. As a result, in each time slot a pulse train of eight pulses is read out. These pulse trains are transmitted to an output 343 via gates 336, 337, 338 and 339, which are rendered operative in cyclic sequence and in synchronism with the shift registers, and via a common OR gate 342.

A central control device 335 controls the devices 317, 319, 320 and 327 and receives information from these devices for effecting the frame and envelope synchronization.

The device 318 is controlled by the device 335 to detect whether position 5 of the data frame contains a stuffing envelope. This will normally be the case, because this position is used in the remote data concentrator for sending stuffing information. The telephone switching centers, however, manipulate this stuffing information to achieve rate matching between the incoming and outgoing data multiplexes, so that there may be no stuffing information in position 5.

From a comparison between the contents of the counters 321 and 329 the central control device 335 can ascertain whether there is a difference in rate between the incoming and outgoing telephone channels and if so what sign it has.

First a case will be considered in which the incoming telephone channel has a higher bit rate than the outgoing telephone channel. This is ascertained by the central control device 335 from the fact that the counter 321 gains on the counter 329. The central control device waits for a data frame the time slot 5 of which contains a stuffing envelope. This is detected by the device 318. From the contents of the counter 321 it now is also known in which shift register the stuffing envelope is stored. At the instant at which it is the turn of this shift register to be read out the central control device 335 gives a command to the counter 329 to advance one count so that the stuffing envelope is not sent.

We will now consider the case in which the incoming telephone channel has a lower rate than the outgoing telephone channel. This can be deduced by the central control device 335 from the fact that the counter 329 gains on the counter 321. The central control device then waits for the instant at which it is the turn of the envelope of the time slot 6 of the outgoing frame to be sent. From the contents of the counter 321 at the instant at which the counter 327 is in the position six it is known in which shift register the envelope of position 6 of the incoming frame has been stored. From the contents of the counter 329 it can then be deduced at which instant the sending of this envelope will start. Immediately before this instant the central control device 335 gives a command to:

1. the decoder 330, causing it to close the gates 336, 337, 338 and 339,
2. the gate 340, causing it to open,
3. the gate 341, causing it to open so that the clock pulses P are applied to the shift register 316,
4. the counter 329 causing this to retreat one position.

After the stuffing envelope has been read out from the shift register 316 and transferred to the output 343 via the gate 340 and the OR gate 342, the control device 335 again releases the decoder 330 and opens the various gates. As a result a stuffing envelope has been sent in position 6 of the outgoing frame. In position 7 of the outgoing data frame the envelope of position 6 of the incoming data frame is sent. Thus all subsequent envelopes of the incoming frame are shifted one position.

When the position 5 of the incoming frame contains a stuffing envelope in the outgoing frame contains stuffing envelopes in the time slots 5 and 6. To make control as simple as possible the maximum number of stuffing envelopes in each data frame is limited to two (positions 5 and 6). The shortening of a frame is only allowed when a stuffing envelope is present in position 5 and possibly in position 6. Lengthening a frame is allowed only when there is no stuffing envelope in position 6. This means that the data frame which at some other point of the path have been lengthened or shortened are allowed to pass unchanged. When a frame is received continuous frame shychronization requires the length of the frame to be determined. On reception of a frame the device 335 first detects whether a stuffing envelope is present in position 5. If this is not the case the frame obviously has a length of 79 positions, and the central control device then gives a command to the counter 327 to add one to the contents. This ensures that the channel structure is maintained and that the end of the frame corresponds to the end state of the counter 327.

When the position 5 of the incoming frame contains a stuffing envelope, the central control device 335 then ascertains whether the position 6 contains a stuffing envelope. When this is not the case the frame has the normal length of 80 positions and the counter 327 need not be corrected. If, however, the position 6 contains a stuffing envelope, the central control device 335 gives a commond to the counter 327 to subtract one from its contents. Thus it is again ensured that the channel structure is maintained and that the end of the frame corresponds to the end state of the counter 327.

It will be appreciated that when the number of stuffing envelopes in each frame is restricted to two, in order to add a stuffing envelope to an outgoing frame the central control device must wait for an incoming frame which contains no stuffing envelope in time slot 6.

The arrangement shown in FIG. 3 may be regarded as a device which produces elastic changes in the length of the frame, in contradistinction to the non-elastic changes produced by slip. This elasticity is incorporated in the data frame in that in the originating data concentrator stuffing information is sent in one of the channels of the data multiplex.

In the telephone switching center shown in FIG. 2 each data transmission telephone connection comprises three internal outgoing channels (highway 215) and one internal incoming telephone channel (line 217) and a pair of devices such as 220 and 222. Normally the highway 215 will comprise the same number of channels as does an external outgoing highway, for example 32, so that the number of data transmission telephone connections may be extended to 10 before a second internal outgoing highway is required.

The pair of devices 220 and 222 uses time slots which are different from the time slots used by the pair of devices 221 and 223, and this enables up to at most 10 pairs to be controlled in time multiplex operation by one central control device 335. A further possibility is to use the devices 300, 317, 318, 319 and the counters 320, 321, 327, 338, 329 in common for a plurality of data transmission telephone connections in time multiplex operation. This requires the use of a cental store which is shared by the data transmission telephone connections.

In actual fact the arrangement of FIG. 3 is a real time data processing system and all the techniques available for the construction of such systems may be used to realize the arrangement of FIG. 3.

In the data switching center 109 of FIG. 1 second-order multiplexes are received from the highways 110*a* and 110*b*, the channels of these multiplexes containing first-order data multiplexes. The second-order multiplexes can directly be demultiplexed, using the frame synchronization information contained in the second-order multiplex and a clock which is coupled as a slave to the incoming highway. This demultiplexing results in a plurality of first-order multiplexes. These may be demultiplexed by using the frame synchronization information present in the data multiplexes and the recognizability of the stuffing information, in a manner analogous to that used in the arrangement shown in FIG. 3. This demultiplexing results in a plurality of data channels, which then may be connected via switching networks to selected outgoing data channels.

The outgoing data channels are again combined to form data multiplexes and either are sent via the data highways 115*a* and 115*b* to the data concentrators 111 and 112 directly connected to the data switching centers 109 or first are combined to form second-order multiplexes and then sent via the highways 110*a* and 110*b* to the remote data concentrators 116, 117, 118 and 119.

At the outgoing end of the data switching center 109 stuffing information is transmitted in one of the channels of the data multiplexes intended for the remote data concentrators in the same manner as at the outgoing ends of the remote data concentrators.

At the incoming ends of the remote data concentrators and at the incoming end of the data switching center 109 the frame synchronization of the data multiplex always is correlated with the presence or absence of stuffing information in given positions of the data frame, generally in the same manner as in the arrangement of FIG. 3 in which the contents of the counter 327 are corrected depending upon the presence or absence of stuffing information.

The transmission of recognizable stuffing information in a channel of a data multiplex is a means of protecting the data multiplex against the effects of slip, so that in future an integrated asychronous telephone network can be used for data transmission.

The remedy against slip can be used not only for data transmission via an asynchronous network but also for coupling two different data networks at multiplex level. Assuming a switching center of a data network A to be connected via a data highway to a swiching center of a data network B, then the data multiplex containing stuffing information which is transmitted via the data highway can be treated by the switching center of the network A and by that of the network B in exactly the same manner as a data multiplex received from a remote data concentrator of the own network.

The invention has been described with reference to an 8-bit transmission system and a specific design of the asychronous switching center. It will, however, be obvious to one skilled in the art that the invention is not restricted thereto. It is readily possible to replace the 8-bit PCM transmission system by a PCM transmission system having a different number of bits per signal sample or by a delta modulation system having one bit per signal sample.

Other known embodiments of the asynchronous switching center may also be used. In a suitable embodiment each incoming highway has a speech store assigned to it, a TDM switching network being connected between the speech stores and the outgoing highways. Completion of a connection is effected in time slots having the same duration as those on the highways instead of in sub-intervals, as is the case in the switching center shown in FIG. 2. In a modification of this embodiment the outgoing highways also have speech stores assigned to them, while in another modified embodiment the number of times slots per cycle in the switching center is time by a factor of 2 (the duration is divided by 2) to reduce the likelihood of blocking. Many other embodiments are known. With respect to the present invention the only important feature is that connections between channels of incoming and outgoing highways can be established, as is the case in all the said embodiments, the exact design of the switching center not being of importance.

What is claimed is:

1. Time division multiplex telecommunication system for data transmission via switched connections, which system comprises a data transmitter for pulse groups which are transmitted in different pulse group positions of consecutive multiplex frames, a transmission highway using time division, means for sending the pulse groups of the pulse transmitter via the transmission highway in one time slot of a cyclic sequence of time slots, which time slot characterizes a time channel, a switching system having a plurality of incoming and outgoing transmission highways, which switching system includes means for connecting the time channels of the incoming transmission highways to arbitrary time chanels of the outgoing transmission highways, characterized in that the data transmitter includes means for continuously transmitting stuffing pulse groups in a particular pulse group position of the multiplex frame, in that the switching system comprises an internal outgoing transmission highway and an internal incoming transmission highway, in that the incoming time channel of the incoming transmission highway which is connected to the data transmitter is connected to three time channels of the internal outgoing transmission highway, in that a device connected to this transmission highway is provided for restoring the sequence of pulse groups supplied by the incoming time channel from the sequence of pulse groups which are received in the three time channels, in that means are provided for converting the pulse repetition rate of the restored sequence of pulse groups to the pulse repetition rate of an outgoing time channel by the addition or removal of stuffing pulse groups, in that means are provided for applying the converted sequence of pulse groups to an internal incoming time channel of the internal incoming transmission highway, and in that in order to complete the connection the internal incoming time channel is connected to a time of an outgoing transmission highway.

* * * * *

UNITED STATES PATENT AND TRADEMARK OFFICE
CERTIFICATE OF CORRECTION

PATENT NO. : 3,908,087
DATED : September 23, 1975
INVENTOR(S) : THIJS KROL

It is certified that error appears in the above-identified patent and that said Letters Patent are hereby corrected as shown below:

IN THE SPECIFICATION

Col. 1, line 33, before "are" should be --errors--;

Col. 3, line 66, "center" should be --centers--;

Col. 4, line 7, "center" should be --centers--;

line 41, "center" should be --centers--;

line 67, "16" should be --sixteen--;

Col. 5, line 16, "16" should be --sixteen--;

line 63, "16" should be --sixteen--;

Col. 6, line 27, "cloc" should be --clock--;

Col. 7, line 47, "of" second occurence should be --to--;

Col. 8, line 1, "device" should be --devices--;

line 44, "spacing" should be --spacings--;

Col. 9, line 46, "RESET" should be --SET--;

Col. 10, line 35, "16" should be --sixteen--;

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*